April 5, 1960  R. L. IGLEHART ET AL  2,931,469
CONTACTING TRAY ASSEMBLY

Filed April 16, 1956  3 Sheets-Sheet 1

INVENTORS:
RICHARD LANNERT IGLEHART
JACK R. SOWLES
BY: *Oswald R. Milmore*
THEIR ATTORNEY April 5, 1960  R. L. IGLEHART ET AL  2,931,469
CONTACTING TRAY ASSEMBLY
Filed April 16, 1956  3 Sheets-Sheet 2

INVENTORS:
RICHARD LANNERT IGLEHART
JACK R. SOWLES
BY: Oswald N. Milmore
THEIR ATTORNEY

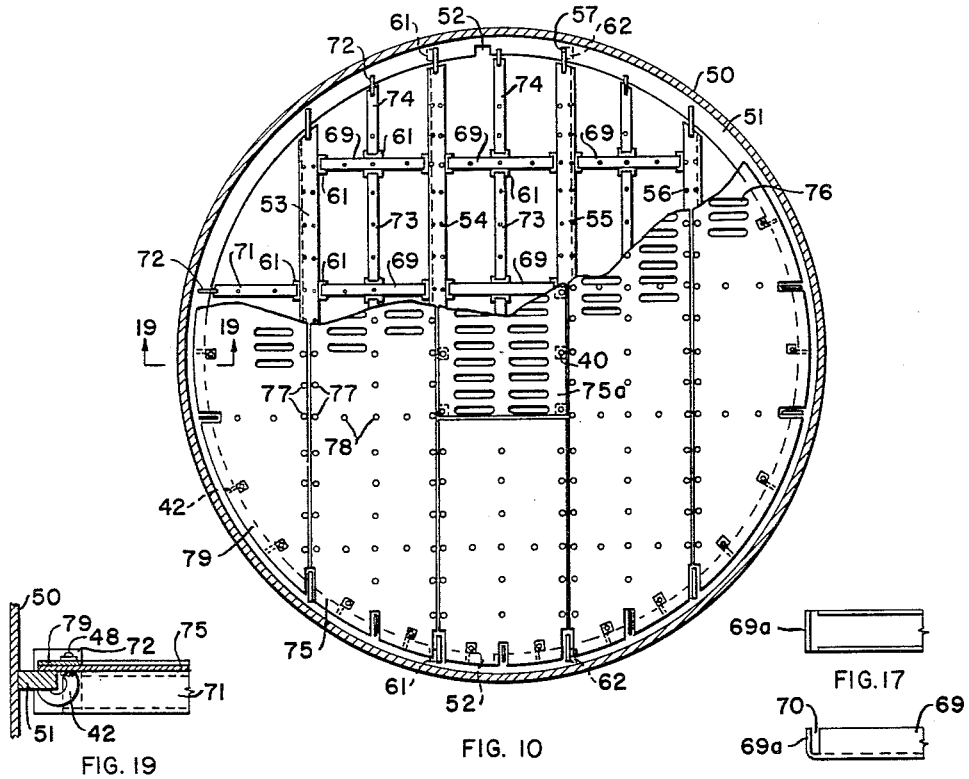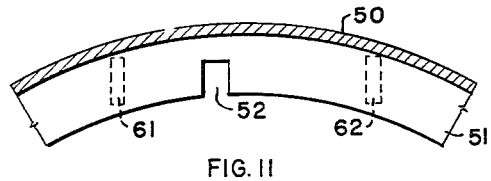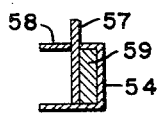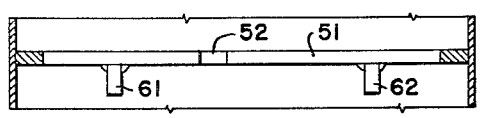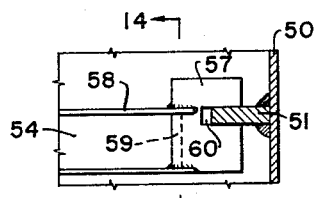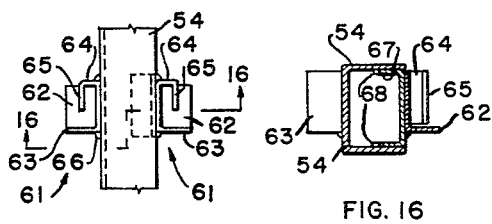

United States Patent Office 2,931,469
Patented Apr. 5, 1960

2,931,469
CONTACTING TRAY ASSEMBLY

Richard Lannert Iglehart, Mill Valley, and Jack R. Sowles, Walnut Creek, Calif., assignors to Shell Oil Company, a corporation of Delaware Application April 16, 1956, Serial No. 578,280

9 Claims. (Cl. 189—34)

This invention relates to contacting columns having trays for effecting contact between a liquid and a gas, e.g., for distillation, said trays being essentially horizontal and having gas passages. While particularly useful for apertured trays, i.e., trays formed of plates having restricted passages, such as slits or holes of other outlines, punched or otherwise formed therein, the invention is also applicable to trays of other types. The invention is, more particularly, concerned with the assembly of the tray within a contacting column.

It is known to fabricate contacting trays of sheet metal having suitable apertures for the passage of gas or both gas and liquid, carried on transverse beams which are supported at their ends on support members such as rings fixed to the column wall. The installation of such trays have heretofore presented certain difficulties, among which are the proneness of the sheet metal deck plates to buckling due to thermal expansion relative to supporting structure to which the plates are fixed when the column is placed into operation, the need to provide special clamps or terminal structures for supporting the beams from the support rings with their upper, load supporting faces coplanar with the rings to permit the deck plates to lie flat and the circumstance that the fastening means which secure the deck plates and/or those which secure the beams had to be manipulated both from the top and the bottom of the tray during installation, which required a workman above the tray and another below it, or made it necessary for a workman above the tray to perform awkward operations.

It is an object of the invention to provide an improved contacting tray assembly whereby the danger of buckling of the sheet metal deck plates is obviated or at least greatly reduced.

A further object is to provide a contacting tray assembly wherein the beams can be mounted with their upper, load-supporting faces above the plane of the support ring, thereby simplifying the fittings at the ends of the beams.

Additional objects are to provide an improved contacting tray assembly which can be more easily installed within a column, and which can be readily installed by a workman stationed above the tray without performing any manipulation beneath the tray.

In summary, the assembly includes, in common with known constructions, a support means, such as a peripheral ring, secured to the inner surface of the upright enclosing wall of the contacting column, transverse beams extending across the column having their ends supported by the support means, and a deck plate supported on the beams, having suitable apertures for the passage of at least gas and spanning at least one inter-beam space.

The first object of the invention is attained by mounting one or more of the beams for horizontal motion, viz., slidably on the support, e.g., by a frictional attachment, and providing spaced struts set between beams (which may but need not be adjacent) and secured thereto so as to increase the inter-beam interval as the struts become longer (herein for convenience called an attachment in expanding relation) when the column is heated; the struts may, of course, be fixed to the beams to transmit tensile stress in the struts, so as further to perform the function of decreasing the said interval upon contraction. The deck plate is fixed to the beams and it is unnecessary to permit relative motion between plate and beams because the deck plate and strut, being similarly influenced by temperature changes, will undergo similar expansions. Buckling of the plate is thereby prevented. It is, of course, advantageous to use a plate having a linear coefficient of thermal expansion substantially equal to that of the struts; this requirement will be met sufficiently when the plate and strut are made of similar metals. This arrangement makes it possible to use relatively thin sheet metal, e.g., 12-gauge to 20-gauge, for the deck plates.

The second object of the invention is attained by mounting the beams with their upper surfaces above the plane of the support means (permitting the ends of the beams to overlie the support beams in supported relation) and attaching trim rims, in the form of ring segments, to the undersides of the deck plates at the margins thereof which adjoin the support means, the said trim rims extending over the support means and being preferably fastened thereto by fasteners which permit some relative horizontal motion between the trim rims and the support means.

The additional objects of the invention are attained by a simplified arrangement of the beams, employing recessed ends which may be in the form of notches in the ends of the beams themselves or bifurcated elements which can be pre-assembled to the beams, permitting the beams to be slid horizontally into place from a wide part of the column toward a narrower part thereof so as to bring the support means into the recess; and by providing fasteners between the deck plate and beams and/or between the trim rims and the support means which can be installed and removed from above the tray.

The invention will be further described with reference to the accompanying drawing forming a part of this specification and showing certain preferred embodiments thereof by way of illustration, wherein:

Figure 10 is a plan view of a tray assembly showing a modified construction wherein the beams have their upper faces coplanar with the support ring and a different arrangement of the spacer struts is used;

Figure 11 is a plan view on an enlarged scale of a part of the support ring used in Figure 10;

Figure 12 is an elevation view corresponding to Figure 11;

Figure 13 is a detail elevation view of the end of a beam and its relation to the support ring and column, which are shown in section;

Figure 14 is a transverse sectional view taken on the line 14—14 of Figure 13;

Figure 15 is a plan view of a part of a beam, showing a detail of the bracket for attaching the spacer struts;

Figure 16 is a sectional view taken on the broken line 16—16 of Figure 15;

Figures 17 and 18 are an elevation view and a plan view, respectively, of the end of a spacer strut; and Figure 19 is an enlarged sectional view taken on the line 19—19 of Figure 10.

Figure 1:
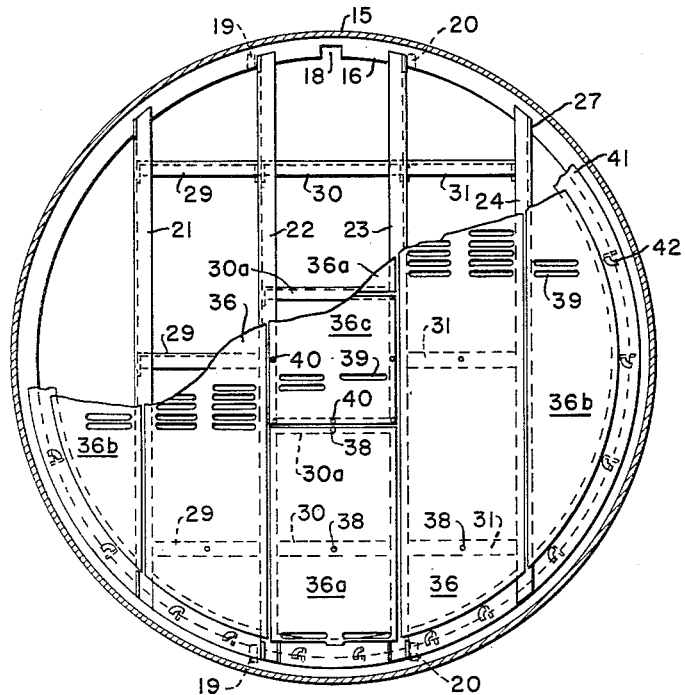
Figure 1 is a plan view of a tray assembly, parts being broken away for clarity and the column being shown in section.
Figure 2:
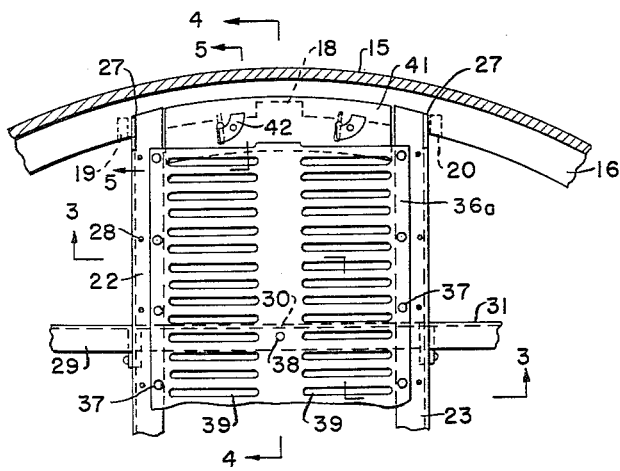
Figure 2 is an enlarged view of a part of the tray of Figure 1.
Figure 3:
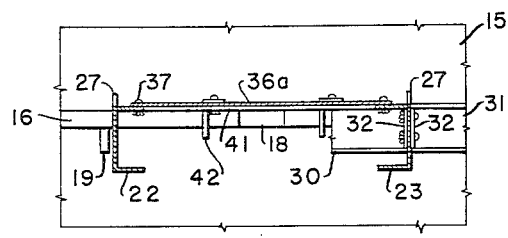
Figures 3, 4 and 5 are sectional views taken on the correspondingly numbered lines of Figure 2, section line 3—3 being broken and the scale of Figure 5 being enlarged.
Figure 4:
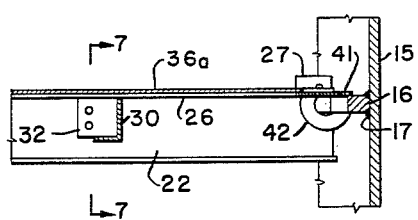
Figure 5:
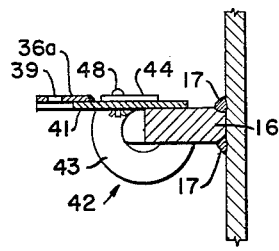
Figure 6:
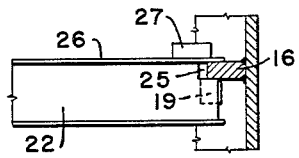
Figure 6 is a detail elevation view of the end of a beam and its relation to the support ring and columns, which are shown in section.

Referring to Figures 1–9 of the drawings, the tray assembly is shown installed within a cylindrical column 15 to the inner face of which there is fixed a horizontal support ring 16, e.g., by welding as indicated at 17 in Figures 4 and 5. When necessary to permit installation of long beams, as is the case in the embodiment shown, a notch 18 is provided at one part of the ring. A pair of alignment stops or positioning lugs 19 is welded to the bottom of the ring at opposite sides of the support ring to one side of a central vertical plane and another pair of lugs 20 is similarly welded on the other side of the said plane. A plurality of trusses or beams 21–24 of any suitable cross section, e.g., channel-shaped as shown, span the column in equally spaced, parallel relation and subdivide the column area into panel areas. Each beam has at each end thereof a notch 25 (Figure 6) shaped to receive the support ring 16 with a small longitudinal clearance and to engage the top and bottom faces of the ring with a sliding fit, whereby the upper flange 26 of the beam overlies the support ring in supported relation. The beam ends are advantageously reinforced, as by welding vertical plates 27 thereto, preferably above the vertical web of the beam. Because the beam 21 and 24 are shorter than the clearance between opposite parts of the support ring 16 at the lugs 19 and 20, respectively, these beams can be installed by merely sliding them horizontally from an inner toward an outer part of the column; in their ultimate positions shown they are capable of lateral sliding movement with respect to the support ring. The two long beams 22 and 23 are installed consecutively by first engaging the end remote from the notch 18 with the ring 16, lowering the other end through the notch 18 to the proper level, and sliding the beam horizontally toward the positioning lugs 19 or 20; in their ultimate positions there is a slight lateral clearance between at least one of these beams and its corresponding pair of positioning lugs to permit lateral sliding motion of the beam on the support ring. It will be noted that the upper beam flanges 26 provide coplanar upper load-supporting faces which are situated above the plane of the upper surface of the support ring 16. Two rows of equally spaced holes 28 are provided in each flange 26.

Figure 7:
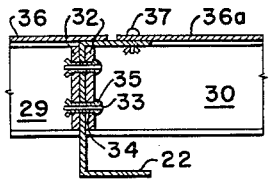
Figure 7 is a transverse sectional view taken on the line 7—7 of Figure 4, shown on an enlarged scale.

Each pair of adjoining beams is interconnected by spacer struts 29, 30 or 31, it being preferred to provide at least two struts between each pair of beams, although a greater number, as shown, may be used. In the embodiment shown each strut is channel-shaped and positioned with the top of the upper flange coplanar with the flanges 26 and has at each end thereof a vertical, transverse attachment plate 32 which lies in flat abutment with the vertical web of the corresponding beam (Figures 3, 4 and 7), and contains a pair of holes aligned with holes in the beam web for receiving a suitable fastener. The plate 32 may be a separate piece which is welded to the strut or may be integral with the strut, formed by bending the end of the web thereof, in the manner of Figure 18. A specific type of fastener which may be used to secure the plates 32 to the beam web is a drive rivet, described in detail in the U.S. Patent 2,640,618 to Hale Jr. As shown in Figure 7, it includes a longitudinally contoured expander pin 33 surrounded by a sleeve 34 which is formed of deformable metal and has an enlarged head 35. Initially the pin projects beyond the head, and the body of the sleeve is externally cylindrical and readily insertible through the aligned holes in the plate and web. A hammer blow against the pin drives it into the sleeve so that the end of the pin is flush with the head; this spreads the other end of the sleeve as shown to lock the rivet to the adjacent plate 32. Such a rivet can be removed by driving the pin farther into the sleeve with the aid of a drive pin; this breaks off the spread parts of the sleeve, thereby unlocking the rivet and enabling it to be pulled out. It is evident that the spacer struts are rapidly and easily installed and removed by a single workman using such rivets to effect a blind connection, although the invention is not limited thereto.

Each panel area is spanned by a sheet metal deck plate 36, 36a, 36b or 36c; although not essential to the invention, each deck plate in the embodiment shown spans only one panel between adjacent beams. The segment-shaped panels between the outer beams 21 and 24 and the arcuate support ring 16 are covered with plates 36b shaped as arcuate segments while the other plates have straight, parallel side edges; the edges near the column wall are approximately arcuate. The arcuate edges lie approximately on a circle which has a diameter slightly less than the inside diameter of the support ring. The deck plates 36 and 36b have lengths about the same as the beams so that only one plate is used in each panel, while the plates 36a and 36c are shorter, for a purpose to be explained hereinafter. Each deck plate has the straight marginal part thereof resting on the adjacent beam so as to overlie slightly less than half of the upper flange 26 (Figures 1 and 7) and each said marginal part has a series of holes located for alignment with the holes 28. The deck plates are secured to the beams by any suitable means, such as drive rivets 37, previously described. They may also be fastened to the spacer struts, as indicated by drive rivets 38. Each deck plate has a plurality of restricted passages for the flow of one or more fluids to be contacted, distributed and shaped as desired, e.g., uniformly over the deck area. In the embodiment shown the openings are slots 39 of identical outlines arranged as two rows of parallel and equally spaced slots. Typically, when the tray is one of a plurality of similar trays mounted at vertical intervals of six to thirty inches in a distillation column, such slots are from 0.125 to 1.0 inch in width and are spaced to provide an aggregate slot area or free area appropriate to the loading conditions at which the column is to be operated, e.g., 5–35%.

It should be observed that by mounting the beams in relative positions to give the panels equal width, it is possible to prepare the deck plates by cutting sections from long rolls of sheet metal in which the restricted passages (and, if desired, also the holes along the marginal parts) have been previously punched or otherwise formed. The holes in the marginal parts are preferably slightly larger than the rivets to facilitate attachment despite some inaccuracy in the dimensions. However, by fabricating the spacer struts to uniform dimensions the inter-beam intervals can be easily held to close tolerance. The sheets metal deck plates are made of metal having approximately the same and, preferably, exactly the same linear coefficient of thermal expansion as the spacer struts and the beams.

If desired, a manway may be provided in one of the panel areas. Thus, in the embodiment illustrated a square, removable manway deck plate 36c which has restricted passages 39 conforming to the openings in the other plates distributed throughout the area is secured by removable fasteners 40 which are conveniently of the type which can be actuated as desired either from the bottom or from the top. Fasteners of this type are known in the art; one specific design is described in the U.S. Patent No. 2,711,307 to Milmore. It is necessary to stiffen or support the transverse margins of the manway deck plate 36c and the adjoining margins of the adjoining deck plates 36a. This may be achieved by providing spacer struts 30a so as to be in supporting relation to both the manway plate and the adjoining plates. These struts are constructed and installed on the beams 22 and 23 in the manner previously described for the struts 30 with the difference that they may be wider so as to afford sufficient area for fastening the plates as indicated at 38 and 40.

Each approximately arcuate margin of the deck plates is supported and connected to the support ring 16 by a trim rim 41; these rims collectively form a trim ring. The trim rims are disposed under the deck plates and over the support ring in overlapping relation and have a thickness equal to the vertical distance from the top of the support ring to the top of the load-supporting faces of the beams, i.e., equal to the thickness of the flange 26 when it rests directly on the support ring as in the embodiment shown. The rims are permanently fastened to the sheet metal deck plates prior to installation, e.g., by spot welding. They are further fastened to the support ring by fasteners which permit some frictional sliding motion between the rims and ring.

Figure 8:
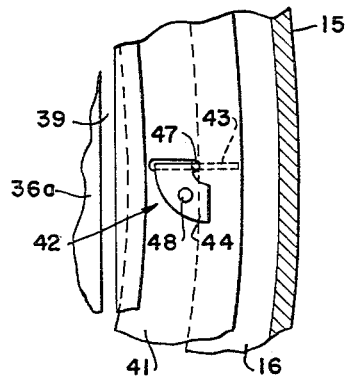
Figure 8 is a plan view of a part of Figure 5.
Figure 9:
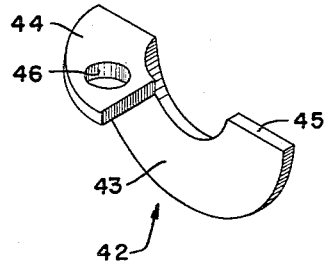
Figure 9 is a perspective view of a fastening clip by which the trim rim is secured to the support ring.

A preferred fastener 42 is shown in Figure 9 and is a clip including a narrow vertical lower or insertable part 43 and a horizontal attachment flange 44 at the top. The lower part is curved to provide an upwardly directed engaging surface 45 which abuts the lower side of the support ring, as shown in Figures 5 and 8. The attachment flange has a hole 46. The trim rim has a plurality of radially elongated slots 47 (Figure 8) shaped to permit the lower part of the clip to be inserted from the top and, in laterally offset relation to each slot, a hole (not visible) in alignment with the hole 46. Each clip is installed by inserting the part 43 down through the slot 47, tilting the clip until the surface 45 is under the support ring and shifting it to bring the hole 46 into alignment with the hole in the trim rim. The flange 44 is preferably shaped to overlie a part of the ring, as shown in Figures 4 and 8, when the clip is in final position. The clip is then secured to the trim rim by inserting a drive rivet 48 through the aligned holes and locking it with a hammer blow.

It is evident from the foregoing that the deck plates can be rapidly secured to the beams and, through their trim rims, to the support ring by the use of drive rivets and that they can also be rapidly removed from the column, both operations being readily performed by a single workman who operates only from above the tray.

When the column is placed into operation and becomes heated by the fluids contacted therein, the deck plates tend to expand thermally. The spacer struts 29, 30, 30a and 31, being similarly influenced by the fluids, expand equally with the deck plates and in so doing expand the intervals between the beams whereby buckling of the plates is prevented. It is obvious that the stops or lugs 19 and 20 must be sufficiently far apart to accommodate the beams 22 and 23 when the latter are pushed apart the maximum distances. These lugs keep the tray assembly centered. The other beams are pushed outwards by the struts 29 and 31. The arcuate margins of the segmental deck plates 36b are thereby pushed toward the support ring 16 and in doing so they effect a sliding motion of the trim rims with respect to the support ring. Expansion occurs also in the direction of the longitudinal axes of the beams. Since the beams and deck plates expand equal amounts, no buckling of the plates is encountered. During this expansion the beams slide also longitudinally with respect to the support ring and the trim rims 41 which lie between the beams undergo a similar sliding movement toward the column wall.

When the column is cooled all parts contract and the action is the reverse of that just described. While in the embodiment shown the spacer struts are fixed to the beams so as to act also in tension to pull the beams together, this is not in every case essential because contraction of the deck plates can achieve this result without danger of buckling.

Referring next to Figures 10-19, there is shown an embodiment which includes several variants which may be applied individually or in combination. The principal distinguishing features are that the upper faces of the beams are coplanar with the support ring, that the spacer struts are attached without riveting or bolting to the beams, and that auxiliary stringers are placed between the spacer struts, parallel to the beams.

In this embodiment the column 50 again has a horizontal support ring 51 fixed therein, but is provided with a pair of notches 52 at opposite sides slightly to one side of a diametric vertical plane. The equally spaced, parallel beams 53-56 are shorter than the span between opposed parts of the support ring and have vertical extension plates 57 set into longitudinal recesses in each end of the upper flange 58 of the beams and welded to both the upper and lower flanges as shown in Figures 13 and 14. A reinforcing block 59 may be welded within the beam between each plate 57 and the vertical beam web. The plates 57 have terminal notches 60 shaped to receive the support ring with longitudinal clearance and to engage the top and bottom of the ring with a sliding fit. Two pairs of alignment stops or positioning lugs 61 and 62 are welded to the underside of the support ring to position both ends of the inner beams 54 and 55 by engagement with their plates 57. The beams are installed as described for the first embodiment; however, the notches 60 are positioned to make the top faces of the flanges 58 coplanar with the top face of the ring 51.

At suitable locations on the beams where spacer struts are to be connected there are brackets 61 of the type shown in Figures 15 and 16. Each bracket includes a floor plate 62, a flat side plate 63, and a flanged side plate 64 having a retaining flange 65 extending in spaced relation toward the plate 63. The bracket on the web side of the channel beam is welded to the web, as indicated at 66; that on the other side is welded to a short channel member 67 which fits snugly between the upper and lower beam flanges and is welded thereto as indicated at 68. The spacer struts 69 extending transversely to the beams may be channel-shaped. As shown in Figures 17 and 18 they have transverse, vertically aligned retaining notches 70 formed by removing the terminal parts of their flanges and bending the web as shown at 69a. The resulting notches 70 are located and shaped to receive the bracket flanges 65. These struts are installed by sliding their ends downward into the brackets. Additional struts 71 are mounted between the outermost beams and the support ring. The ends of the latter struts adjoining the beams have transverse notches to interlock the brackets as described for the struts 69; the other ends terminate in spaced relation to the support ring and have vertical extension plates 72 affixed thereto. These plates correspond to the plates 57 at the ends of the beams and are similarly attached to the struts and similarly provided with notches for receiving the support ring. The upper faces of all struts are coplanar with the support ring.

The spacer struts 69 and the struts 71 optionally carry brackets 61, constructed as previously described, for receiving internal stringers 73 spanning adjacent struts and terminal stringers 74 extending between the support ring and the nearest strut. These stringers are constructed and vertically positioned as are the struts 69 and 71, respectively, but do not carry brackets 61. The brackets 61 on the struts are preferably located to position the stringers at equal distances from the nearest beams, so as to lie under the imperforate parts of the deck plates, between the two rows of slots.

The deck plates 75 are constructed and attached to the beams as previously described and have similar restricted passages 76, suitable rows of holes being provided along their straight margins and in the upper beam flanges 58, through which drive rivets 77 are inserted. Additional aligned holes are provided at the struts and stringers for receiving drive rivets 78. The deck plates in this embodiment are larger and their arcuate margins extend over the support ring 51, to which they are secured by suitable means such as clips 42 of the type shown in Figure 9 (except that the attachment flanges are rectangular) and secured by drive rivets 48 as previously described. It is desirable, in many cases—particularly when relatively thin sheet metal is used—to reinforce the arcuate margin by trim rims 79 which are fixed, e.g., by spot welding, to the upper sides of the deck plates. The clips 42 extend through both the trim ring and deck plate, as shown in Figure 19. As in the previous embodiment, one deck section 75a may be constructed as a manway section and connected to the beams 54 and 55 and to the spacer struts 69 and stringer 73 by fasteners 40 which can be manipulated as desired from the top and bottom. The stringer provided in the manway can be easily lifted out of its brackets 61 after the section 75a is raised.

We claim as our invention:

1. A tray assembly including fixed annular support means, a plurality of horizontally spaced transverse beams spanning and having end parts thereof supported on said support means and including portions engaging the underside of said support means, at least one of said beams being mounted for horizontal movement relative to said support means to vary the interval between said movable beam and an adjacent beam, a plurality of spacer struts interconnecting said movable beam and another beam and secured to both said beams in expanding relation, and a thin apertured deck plate supported on and spanning the interval between the interconnected beams, said plate being fixed to both of said interconnected beams and having a linear coefficient of thermal expansion substantially equal to that of said spacer struts.

2. A tray assembly according to claim 1 wherein the beams have vertical webs and said spacer struts include at the ends thereof attachment elements which are disposed in abutting relation to said webs and detachably secured thereto by fasteners extending through aligned holes in said webs and attachment elements.

3. A tray assembly according to claim 1 wherein the beams carry brackets for attaching said spacer struts to the beams, said brackets and struts having complementary surfaces permitting relative vertical sliding motion and securing the struts laterally.

4. In combination with the tray assembly according to claim 1, stringers extending between said spacer struts in spaced relation to the beams and having upper faces which are coplanar with the upper faces of the beams for supporting parts of said deck plate.

5. A tray assembly including fixed annular support means, a plurality of horizontally spaced transverse beams spanning and having end parts thereof overlying said support means in supported relation and including portions engaging the underside of said support means, said beams having upper load-supporting faces situated at a level displaced from the plane of the upper surface of said support means, an apertured deck plate supported on said faces of the beams and secured thereto, and a trim rim overlying said support means and fastened to the marginal parts of said deck plate adjoining said support means.

6. A tray assembly according to claim 5 wherein at least one of said beams is horizontally slidable on said support means to vary the interval between adjacent beams, said movable beam having a plurality of spacer struts interconnecting said movable beam and an adjacent beam and secured to both said beams in expanding relation, and said trim rim is provided with fasteners securing the rim to the support means.

7. A tray assembly according to claim 6 wherein said fasteners of the trim rim are in frictionally slidable engagement with the underside of the support means.

8. A tray assembly including fixed annular support means, a plurality of horizontally spaced transverse beams spanning and having end parts thereof overlying said support means in supported relation and including portions engaging the underside of said support means, said beams having upper load-supporting faces situated above the plane of the upper surface of said support means, a plurality of apertured deck plates supported on said faces of the beams and secured thereto, and a segmented trim rim overlying said support means and fastened to the underside of the marginal parts of said deck plates adjoining said support means.

9. A tray assembly including a fixed annular support ring, a plurality of horizontally spaced transverse beams having recessed ends with parts thereof in engagement respectively above and beneath said support ring, said ring having a recess on the inner face thereof providing a clear interval spanning the column in excess of the total length of the part of the beam on one side of the ring, and an apertured deck plate spanning the interval between adjacent beams and supported thereon.

References Cited in the file of this patent

UNITED STATES PATENTS

| | | |
|---|---|---|
| Re. 22,946 | Glitsch | Dec. 9, 1947 |
| 1,604,875 | Bogaty | Oct. 26, 1926 |
| 2,231,297 | Saxe | Feb. 11, 1941 |
| 2,374,550 | McIntosh | Apr. 24, 1945 |
| 2,375,409 | Glitsch | May 8, 1945 |
| 2,582,826 | Glitsch | Jan. 15, 1952 |
| 2,619,337 | Blazer | Nov. 25, 1952 |
| 2,710,678 | Rapisarda | June 14, 1955 |